United States Patent
Boltz et al.

(10) Patent No.: US 7,387,287 B2
(45) Date of Patent: Jun. 17, 2008

(54) PERFORATED SECTION SUPPORTING DEVICE ADAPTED TO BE FIXED TO A SURFACE SUCH AS A CEILING

(75) Inventors: Roland Boltz, Estrees Saint Denis (FR); Stéphane Quertelet, Remy (FR)

(73) Assignee: I.C.M. Group, Montbard (FR)

( * ) Notice: Subject to any disclaimer, the term of this patent is extended or adjusted under 35 U.S.C. 154(b) by 53 days.

(21) Appl. No.: 10/812,910

(22) Filed: Mar. 31, 2004

(65) Prior Publication Data
US 2004/0245414 A1 Dec. 9, 2004

(30) Foreign Application Priority Data
Mar. 31, 2003 (FR) .................. 03 03947

(51) Int. Cl.
*A47H 1/10* (2006.01)
(52) U.S. Cl. .............. 248/317; 248/300; 248/301; 248/323; 248/327; 248/307; 248/333; 248/157; 211/26; 211/72; 211/175; 211/207
(58) Field of Classification Search ........... 248/161, 248/317, 327, 323, 300, 301, 307, 333, 339, 248/176.1, 407, 157, 411, 309.1; 211/70.1, 211/87.01, 90.01, 60.1, 113, 26, 72, 175, 211/207, 190, 192; 403/326, 329, 353
See application file for complete search history.

(56) References Cited

U.S. PATENT DOCUMENTS

| | | | | |
|---|---|---|---|---|
| 3,263,388 A | * | 8/1966 | Bogert | 52/665 |
| 3,889,439 A | * | 6/1975 | Kaspar | 52/709 |
| 4,173,934 A | * | 11/1979 | Searby | 108/107 |
| 4,197,952 A | * | 4/1980 | De Fouw et al. | 211/191 |
| 4,285,436 A | * | 8/1981 | Konstant et al. | 211/192 |
| 4,708,252 A | * | 11/1987 | Azzi | 211/192 |
| 4,715,502 A | * | 12/1987 | Salmon | 211/26 |
| 5,118,066 A | * | 6/1992 | Perrault et al. | 248/333 |
| 6,086,025 A | * | 7/2000 | Hormann | 248/127 |
| 6,098,818 A | * | 8/2000 | Ali et al. | 211/50 |
| 6,293,056 B1 | | 9/2001 | Ping | 52/39 |
| 6,471,177 B1 | * | 10/2002 | Emrick et al. | 248/544 |
| 6,655,533 B2 | * | 12/2003 | Guebre-Tsadik | 211/26 |
| 6,920,831 B2 | * | 7/2005 | Lin | 108/107 |

FOREIGN PATENT DOCUMENTS

| | | |
|---|---|---|
| EP | 0 108 222 | 5/1984 |
| EP | 108222 A2 * | 5/1984 |
| EP | 0 813 279 | 12/1997 |
| FR | 2 812 927 | 2/2002 |

* cited by examiner

Primary Examiner—Brian Glessner
Assistant Examiner—Todd M. Epps
(74) Attorney, Agent, or Firm—Young & Thompson

(57) ABSTRACT

A fixing device which can be fixed to a surface such as a ceiling and receive a perforated section comprises a plate for fixing it to the surface and a support for receiving the perforated section. The support has a wall substantially perpendicular to the plate and at least two claws with the same orientation which cooperate with corresponding perforations of the perforated section. The wall includes a precut locking lug which can be bent into another perforation and cooperate with an edge of that perforation to immobilize the perforated section against movement in translation.

8 Claims, 3 Drawing Sheets

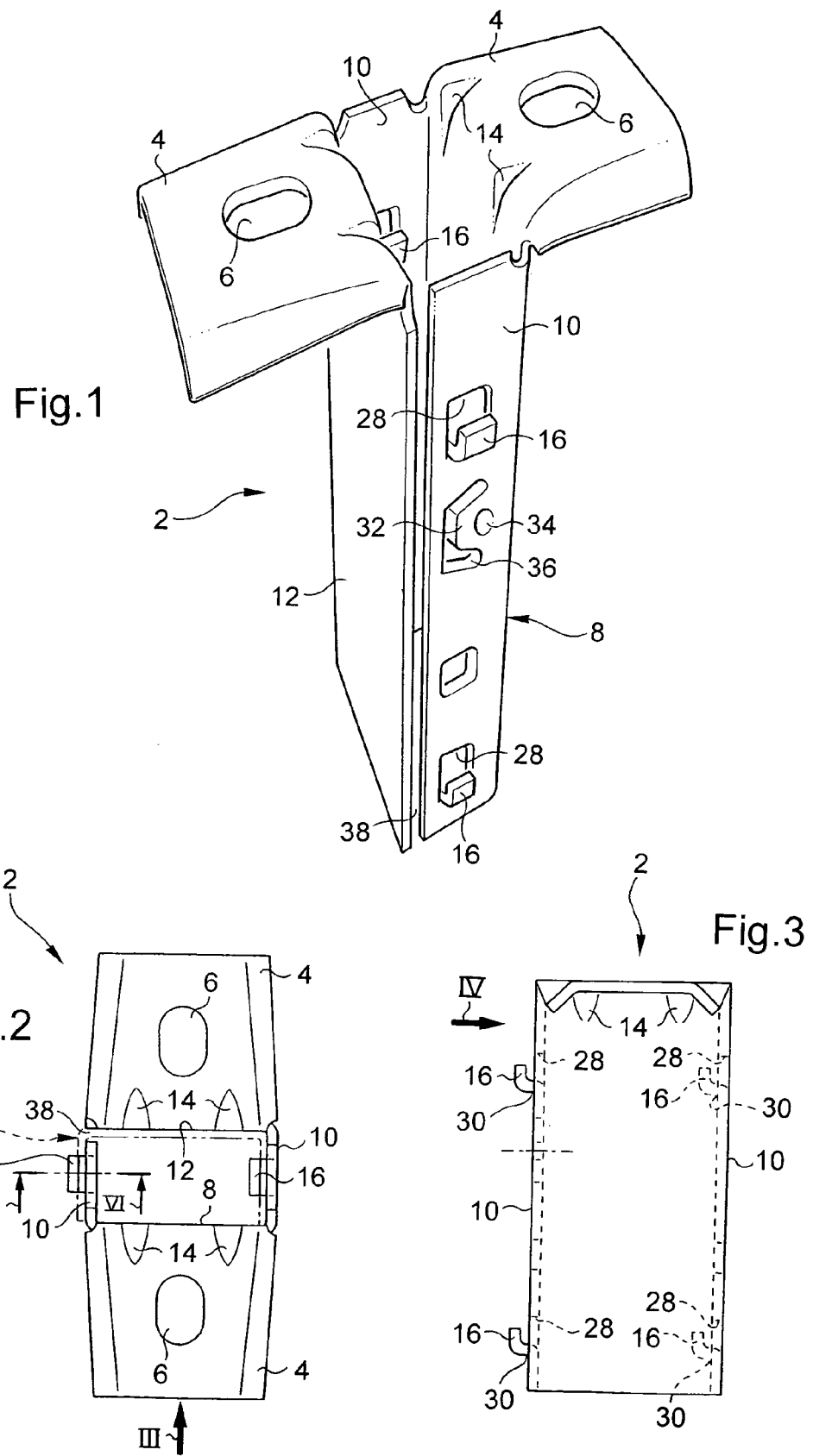

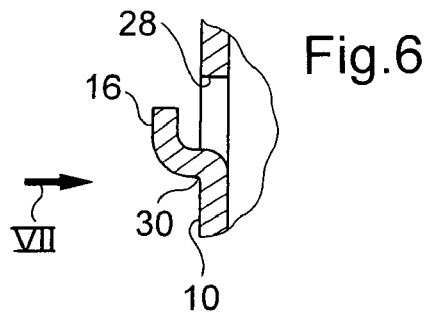
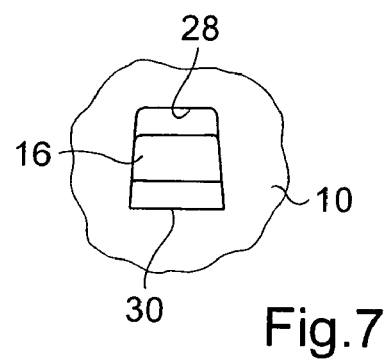
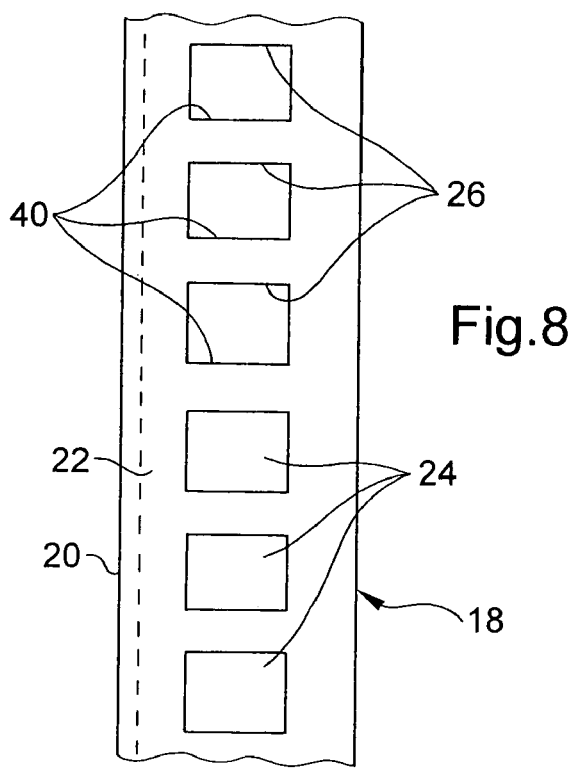
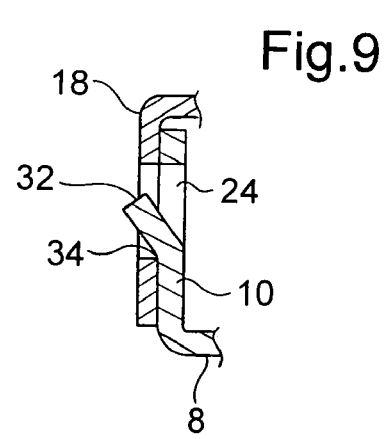

PERFORATED SECTION SUPPORTING DEVICE ADAPTED TO BE FIXED TO A SURFACE SUCH AS A CEILING

BACKGROUND OF THE INVENTION

1. Field of the Invention

The present invention relates to a perforated section supporting device adapted to be fixed to a surface such as a ceiling.

2. Description of the Prior Art

The present invention relates more particularly to fixing devices often called "hangers". Such devices are generally fixed to a ceiling by means of screws. A U-section rail is then hooked onto the device to serve as an upright of a structure that is used to support cable ducting or the like, for example. Brackets are therefore fixed to the U-section rail suspended from the ceiling.

Most devices of the above kind that are commercially available at present have a sheet metal top plate designed to be fixed to a ceiling by means of screws. The top plate is a flat plate adapted to be fixed to the ceiling and a support projecting from one side of the plate receives the perforated rail section. The rail section is generally fixed to the support by means of nuts and bolts. The document EP 0 813 279 discloses one example of this kind of structure.

The main drawback of these structures is that it is necessary to provide nuts and bolts for fixing to them the rail sections that they support. As already indicated, these fixing-devices are intended to be fixed to a ceiling. The person responsible for fixing the rail section onto the fixing device must take with him not only the section to be installed but also the corresponding nuts and bolts and the tools (wrenches) for installing the section. What is more, this task is uncomfortable because the operative must work with his arms above his head.

An object of the present invention is to provide a fixing device adapted to receive a rail section that enables easy installation of the latter and that preferably does not require nuts and bolts or other fixing means for fastening the rail section to the fixing device.

SUMMARY OF THE INVENTION

To this end, the present invention proposes a fixing device adapted to be fixed to a surface such as a ceiling and to receive a perforated section, the device comprising a plate for fixing it to the surface and a support for receiving the perforated section and having a wall substantially perpendicular to the plate and at least two claws with the same orientation adapted to cooperate with corresponding perforations of the perforated section, wherein the wall includes a precut locking lug adapted to be bent into another perforation and cooperate with an edge of the perforation to immobilize the perforated section against movement in translation.

To fix a perforated section, once a support of the above kind has been fixed to a ceiling, it suffices for the claws on the support to cooperate with the corresponding perforations in the perforated section to hook the section onto the support. To fasten the perforated section to the fixing device, it is then sufficient to bend the locking lug so that it enters the other perforation in the perforated section, immobilizes the latter, and fastens it to the fixing device. Thus it can be seen that no accessory is required for fixing the perforated section to its fixing device. A tool such as a screwdriver, for example, is sufficient for bending the locking lug.

For example, the present invention provides a fixing device adapted to receive a U-section with branches comprising perforations, in which case the support has two parallel walls, the distance between the parallel walls corresponds to the distance between the branches of the U-section, each of the parallel walls has at least one claw, all the claws have the same spatial orientation, and at least one of the parallel walls has a locking lug. In this embodiment, which is suited to a U-section, the two parallel walls are connected by a base perpendicular to each of the parallel walls and to the fixing plate.

When the fixing device is suited to a U-section, the support is a substantially rectangular-section tube, two opposite lateral walls of the tube correspond to the parallel walls, the claws of one of the parallel walls project into the support, the claws of the other of the parallel walls project out of the support, and the support has a longitudinal slot at one corner of the support, on the side of the wall with the claws projecting out of the support. In this embodiment the fixing plate comprises two lugs each extending at a right angle from one end of a wall of the tube forming the support. This embodiment is advantageous in that it enables the fixing device to be made by cutting and bending sheet metal.

In a fixing device according to the invention the claws are produced by cutting a tongue into the corresponding wall and bending it along two transverse bending lines so that the free end of the tongue is substantially in a plane parallel to the plane of the wall, the distance between the end of the tongue and the wall corresponding to the thickness of the perforated section adapted to be fixed to the support.

The locking lug is preferably aligned with the claws on the same wall. It is then advantageously adapted to be bent along a bending line perpendicular to the bending lines of the claws.

For improved locking, and to compensate the fabrication tolerances of the fixing device and the perforated section, the locking lug is preferably trapezium-shaped.

Details and advantages of the present invention will emerge more clearly from the following description, which is given with reference to the appended diagrammatic drawings.

BRIEF DESCRIPTION OF THE DRAWINGS

FIG. 1 is a perspective view of a device according to the invention.

FIG. 2 is a plan view of the FIG. 1 device.

FIG. 3 is a view in the direction of the arrow III in FIG. 2.

FIG. 6 is a view in section taken along the line VI-VI in FIG. 2.

FIG. 7 is a view in the direction of the arrow VII in FIG. 6.

FIG. 8 is a partial view in elevation of a U-section adapted to be fixed to the device from FIGS. 1 to 4.

FIG. 9 is a view in section taken along the line IX-IX in FIG. 5.

DETAILED DESCRIPTION OF THE PREFERRED EMBODIMENT

Figure 4:
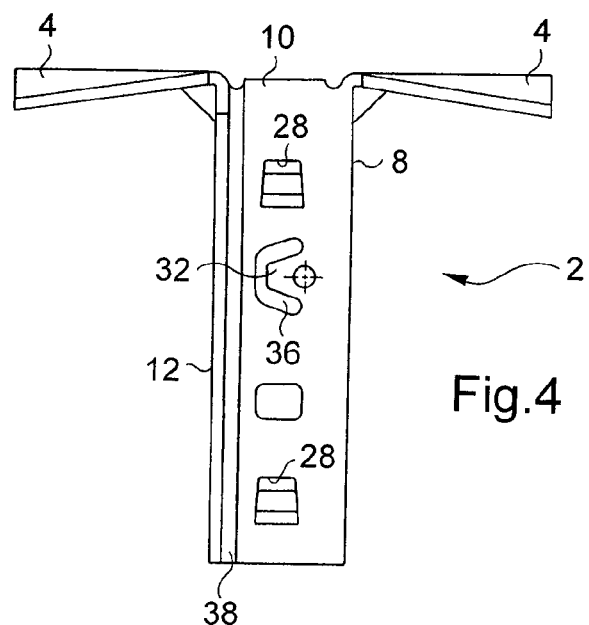
FIG. 4 is a view in the direction of the arrow IV in FIG. 3.

FIGS. 1 to 4 show from various angles a preferred embodiment of a fixing device 2 according to the present invention. This fixing device is obtained by cutting and bending a sheet metal blank. It generally comprises a plate for fixing it to a surface and a support.

The fixing plate here comprises two fixing lugs 4 lying in substantially the same plane. Each of these fixing lugs 4 has, substantially at its center, an oblong hole 6 through which a screw may be passed to fix the corresponding fixing lug 4 to a surface, in particular a ceiling. As can be seen in the drawing, the longitudinal edges of each fixing lug 4 are bent at approximately 45° for increased stiffness.

The support is used to fix a rail section so that when the fixing lugs 4 are screwed to a ceiling the rail section is vertical and forms an upright that is subsequently used to support objects. This support is more particularly intended for a U-section rail comprising a base and two lateral branches. Rectangular perforations are provided at regular intervals in the branches of the section and are disposed so that the perforations in one branch face the perforations in the other branch. In France this kind of rail section is known as an "EDF ladder".

As can be seen in the drawing, the general shape of the support is that of a rectangular-section tube perpendicular to the fixing lugs 4.

The support comprises a base 8, two lateral walls 10, and a cover 12.

The base 8 is opposite the cover 12. The two faces of the tube corresponding to the longer sides of the rectangular section of the tube form the support. These are two plane faces with no openings in them. Each carries the fixing lugs 4 at its upper end (assuming that the fixing device is in position against a ceiling). The lugs 4 are at a right angle to the base 8 and the cover 12. Stiffener ribs 14 are provided between each fixing lug 4 and the corresponding face of the support.

Each lateral wall 10 has two claws 16 designed to cooperate with perforations in a rail section as described above. FIG. 8 is a side view of this kind of rail section. As indicated above, it is a section 18 intended to be installed vertically, like a pillar, and fixed to the fixing device according to the invention. It is made from bent sheet metal, for example, and has a U-section with a core 20 and two parallel branches 22. Perforations 24 in each of the branches 22 are disposed in a line at a certain pitch and are of generally rectangular shape in this example.

The claws 16 of the same lateral wall 10 are spaced by a distance corresponding to a multiple of the spacing of the perforations 24. The claws 16 are arranged so that each is able to cooperate with an edge 26 of a perforation 24. FIGS. 6 and 7 show a claw 16 on a lateral wall 10 in more detail. Each claw 16 is obtained by cutting along three sides of a rectangular opening 28 and bending along a line 30 corresponding to the uncut fourth side of the opening 28. The material is bent twice at 90° so that the claw 16 is parallel to the lateral wall 10 and at a distance from the latter globally corresponding to the thickness of the edge of the perforations 24 of the section 18, which in this instance corresponds to the thickness of the branches 22 of the section 18.

Figure 5:
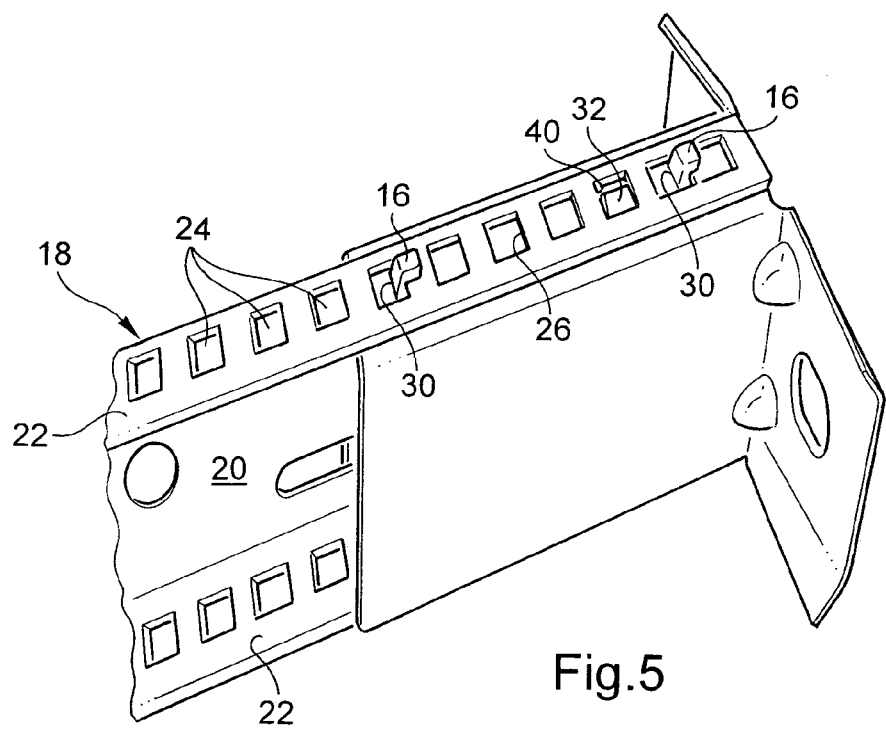
FIG. 5 is a perspective view of the device according to the invention cooperating with a U-section rail.

As the claws 16 are intended to carry the section 18, the bending line 30 is at the edge of the corresponding opening 28 opposite the fixing lugs 4. The two bends are made at 90° but the second bend is in the opposite direction to the first bend. The claw 16 is therefore oriented toward the fixing lugs 4 and is at the same height as the opening 28 from which it has been formed. Thus when the section 18 is mounted on its support (FIG. 5), the edge 26 of a perforation 24 rests on a claw 16.

The four claws 16 of the support are spatially oriented in the same manner. Thus two claws 16 on one lateral wall 10 project into the support and the two other claws 16 on the other lateral wall 10 project out of the support. The distance between the two lateral walls 10 is substantially equal to the distance between the two parallel branches 22 of the section 18.

To enable a section 18 to be completely immobilized on its support, the latter has a locking lug 32. In the preferred embodiment shown in the drawings, there is a lug 32 on only one of the lateral walls 10, namely the lateral wall 10 on which the claws 16 project out of the support. This locking lug 32 is aligned with the claws 16 on the same lateral wall 10 and is positioned so that it is able to cooperate with one of the perforations 24 aligned with the perforations 24 cooperating with the claws 16 of the same lateral wall 10.

In the embodiment shown in FIGS. 4 and 9, the locking lug 32 is cut out from said lateral wall 10. The corresponding cut is U-shaped to leave a bending line 34 in the plane of the corresponding lateral wall 10 perpendicular to the bending lines 30 of the claws 16. A clearance 36 is provided between the free edge of the locking lug 32 and the edge of the cut-out, these two edges being parallel so that a tool, for example a screwdriver, can be inserted to bend the locking lug 32.

The support also has a longitudinal slot 38 extending the entire length of the support. This slot 38 is formed at the corner between the cover 12 and the lateral wall 10 carrying the claws projecting out of the support. The slot 38 is sufficiently wide to allow at least partial insertion of the section 18 into the support. The width of the slot is therefore greater than the thickness of the sheet metal from which the section 18 is made. The width of the slot 38 is twice the thickness of the sheet metal, for example.

The fixing device described above is used in the following manner. This device is first fixed to a ceiling. Screws passing through the openings 6 in the fixing lugs 4 are used for this purpose. The walls of the support are then perpendicular to the ceiling. The section 18 is then fixed to the support of the device according to the invention. To this end, it is partially inserted into the support. One end of the section 18 to be fixed is offered up to the open free end of the support with the core 20 of the section 18 at the level of the slot 38 in the support. A portion of the section 18 slides inside the support. As it slides, the core 20 of the section 18 is parallel to the cover 12 of the support. The cover 12 guides the movement of the section 18, which is then hooked onto the support by inserting each claw 16 into a corresponding perforation 24 in the branches 22 of the section 18. Once the claws 16 are inside the corresponding perforations 24 of the section 18, the section 18 may be released, and then remains in place because of its weight. To lock it in this position, the locking lug 32 is bent into the perforation 24 facing it (FIG. 9).

The locking lug 32 is advantageously trapezium-shaped. This shape takes up any clearance between the height of the locking lug 32 and the corresponding perforation 24 of the section 18. On bending the locking lug 32, one edge thereof comes to rest on an edge 40 of a perforation 24 in the section 18. The edge 40 a perforation 24 is opposite the edge 40 previously mentioned adapted to cooperate with a claw 16.

Once the locking lug 32 has been bent, the section 18 is fixed and no longer has any degree of freedom. The section 18 can then serve as a pillar and receive a bracket for supporting cable ducting, for example.

The embodiment described hereinabove is advantageous because it can be made by cutting and bending sheet metal. The embodiment described hereinabove is very stiff. It also provides good retention of the rail section fixed to said support. What is more, fixing requires no accessory devices (for example nuts and bolts). The person responsible for installing the pillars of a structure intended to support cable ducting, for example, starts by simply fixing the fixing devices to the ceiling. The next task is fixing the pillars, and is very quick, because a simple movement hooks the pillar onto the corresponding fixing device and fixing is completed by bending a locking lug. Thus fixing is fast and requires only a screwdriver, which is part of the basic toolkit of a fitter, who always has one in one of his pockets.

The embodiment based on bending and cutting sheet metal is particularly advantageous in that the starting sheet metal can be galvanized or electrozincplated, for example continuously galvanized by the Sendzimir process (standard NF/EN/DIN 10142), the resulting fixing device then being protected from corrosion without necessitating any anticorrosion treatment once the fixing device has been fabricated.

The present invention is not limited to the preferred embodiment described above by way of non-limiting example. It also relates to all variants within the scope of the following claims that will be evident to the person skilled in the art.

For example, the fixing device according to the invention could be obtained by welding sheet metal rather than by cutting and bending. Making a fixing device of this kind from a material other than sheet metal may also be envisaged. A suitable fabrication method (injection molding, etc.) may be envisaged.

The shape of the fixing device may also be modified. In the shape described, the fixing lugs are attached to the base and to the cover of the support described. They could equally be attached to the lateral walls thereof. Four fixing lugs could equally be provided. Any variant of this may be envisaged.

The support does not necessarily take the form of a rectangular-section tube. This shape is a preferred shape suitable for a section commonly known in France as an "EDF ladder". A different embodiment would be appropriate for a fixing device to be used with a section of some other type.

The invention claimed is:

1. A fixing device adapted to be fixed to a surface, comprising:
    two fixing lugs for fixing the fixing device to the surface; and
    a support having at least three walls defining an interior space, each of said at least three walls being integral with and substantially perpendicular to said two fixing lugs,
    a first wall of an opposing pair of said at least three walls having plural first claws that are bent into the interior space along a first fold line and a second wall of said opposing pair having plural second claws that are bent out of the interior space along a second fold line parallel to the first fold line, at least one of said first and second walls having a locking lug that is bent along a third fold line that is perpendicular to the first fold line.

2. The fixing device of claim 1, wherein the interior space has a longitudinal axis perpendicular to said two fixing lugs, and wherein the third fold line is parallel to the longitudinal axis.

3. The fixing device of claim 1, wherein said support has four of said at least three walls and wherein said support has one corner at which an adjacent pair of said four walls are separated by a gap.

4. The fixing device of claim 3, further comprising a perforated section that is generally U-shaped, said section having a base that is in said gap and abutting one of said four walls other than said opposing pair of walls, said section having a first arm that is inside the interior space and that has first perforations in which said first claws are received and a second arm that is outside the interior space and that has second perforations in which said second claws are received, said locking lug being received in one of said first and second perforations.

5. The fixing device of claim 3, where said support has three corners at which adjacent ones of said four walls are directly attached to each other.

6. The fixing device of claim 3, wherein said gap extends along an entire length of said support and wherein said adjacent ones of said four walls that are directly attached to each other at said three corners are directly attached to each other along the entire length of said support.

7. The fixing device of claim 1, further comprising a perforated section having a first arm that is inside the interior space and that has first perforations in which said first claws are received and a second arm that is outside the interior space and that has second perforations in which said second claws are received, said locking lug being received in one of said first and second perforations.

8. The fixing device of claim 1, wherein each of said first and second claws is also bent along a fourth fold line parallel to and spaced from respective ones of said first and second fold lines, so that a distal end portion of each of said first and second claws is parallel to a respective one of said first and second walls.

* * * * *